US009275056B2

(12) United States Patent
Amacker

(10) Patent No.: US 9,275,056 B2
(45) Date of Patent: Mar. 1, 2016

(54) SYSTEM AND METHOD OF PRESENTING MEDIA DATA

(75) Inventor: Matthew W. Amacker, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1380 days.

(21) Appl. No.: 11/957,230

(22) Filed: Dec. 14, 2007

(65) Prior Publication Data

US 2009/0158147 A1 Jun. 18, 2009

(51) Int. Cl.
*G06F 17/30* (2006.01)
*G06F 9/44* (2006.01)

(52) U.S. Cl.
CPC ........ *G06F 17/30058* (2013.01); *G06F 9/4443* (2013.01)

(58) Field of Classification Search
CPC G11B 27/102; G11B 27/323; G06F 17/3005; G06F 17/30064; G06F 17/30861; G06F 17/3064; G06Q 30/0253; G06Q 30/0256; G06Q 30/0282
USPC ................................................. 715/751, 700
See application file for complete search history.

(56) References Cited

U.S. PATENT DOCUMENTS

| | | | | |
|---|---|---|---|---|
| 5,475,811 | A * | 12/1995 | Neumann et al. | 345/473 |
| 6,379,251 | B1 * | 4/2002 | Auxier et al. | 463/42 |
| 6,538,665 | B2 * | 3/2003 | Crow et al. | 715/723 |
| 6,791,579 | B2 * | 9/2004 | Markel | H04N 7/088 348/E5.006 |
| 7,263,497 | B1 * | 8/2007 | Wiser et al. | 705/51 |
| 7,346,543 | B1 * | 3/2008 | Edmark | 705/27.2 |
| 7,739,596 | B2 * | 6/2010 | Clarke-Martin | G06Q 30/02 715/205 |
| 7,962,948 | B1 * | 6/2011 | Girouard et al. | 725/115 |
| 7,975,020 | B1 * | 7/2011 | Green et al. | 709/217 |
| 8,171,509 | B1 * | 5/2012 | Girouard et al. | 725/32 |
| 8,490,117 | B1 * | 7/2013 | Brichford | 719/328 |
| 2002/0056082 | A1 * | 5/2002 | Hull et al. | 725/1 |
| 2002/0112247 | A1 * | 8/2002 | Horner | G06F 17/30017 725/112 |
| 2002/0124100 | A1 * | 9/2002 | Adams | 709/232 |
| 2004/0044569 | A1 | 3/2004 | Roberts et al. | |
| 2004/0198279 | A1 * | 10/2004 | Anttila et al. | 455/179.1 |
| 2006/0041590 | A1 | 2/2006 | King et al. | |
| 2006/0085825 | A1 * | 4/2006 | Istvan et al. | 725/86 |
| 2006/0188229 | A1 | 8/2006 | Yamagata et al. | |
| 2007/0005795 | A1 | 1/2007 | Gonzalez | |
| 2007/0033177 | A1 * | 2/2007 | Friedman | 707/4 |
| 2007/0094076 | A1 * | 4/2007 | Perkowski et al. | 705/14 |

(Continued)

FOREIGN PATENT DOCUMENTS

WO WO2006045061 A2 * 4/2006

OTHER PUBLICATIONS

Leggett, R. Flash Applications for Mobile Devices. Springer. 2006. ISBN: 978-1-59059-558-9. pp. 9-13, 121.*

Zorlu, Ahmet. "Flash, JavaScript and the HTML DOM (dHTML)" posted Mar. 11, 2001 and retrieved from http://actionscript.org/forums/showthread.php3?t=880 on Nov. 23, 2012.*

(Continued)

*Primary Examiner* — Amy M Levy
(74) *Attorney, Agent, or Firm* — Lee & Hayes, PLLC

(57) ABSTRACT

Systems and methods of presenting media data are provided. A particular method includes receiving a first event message associated with the media data from a media engine presenting media data via a graphical user interface (GUI). The method also includes executing an instruction in response to the first event message. The instruction modifies an in-memory representation associated with the GUI in which the media data is being presented.

34 Claims, 7 Drawing Sheets

(56) References Cited

U.S. PATENT DOCUMENTS

| | | | |
|---|---|---|---|
| 2007/0100882 A1* | 5/2007 | Hochwarth et al. | 707/104.1 |
| 2007/0192181 A1 | 8/2007 | Asdourian | |
| 2007/0233513 A1 | 10/2007 | Lapstun et al. | |
| 2007/0245243 A1 | 10/2007 | Lanza et al. | |
| 2007/0266305 A1 | 11/2007 | Cong et al. | |
| 2008/0005166 A1* | 1/2008 | Cragun et al. | 707/104.1 |
| 2008/0295006 A1* | 11/2008 | LuVogt et al. | 715/764 |
| 2009/0049052 A1* | 2/2009 | Sharma et al. | 707/10 |
| 2009/0150920 A1* | 6/2009 | Jones | 725/23 |

OTHER PUBLICATIONS

Ferg, Stephen. "Event-Driven Programming: Introduction, Tutorial, History" Version 0.2—Feb. 8, 2006, retrieved [http://sourceforge.net/projects/eventdrivenpgm/files/] retrieved on [Dec. 22, 2014], originally at [http://eventdrivenpgm.sourceforge.net/].*

Qiu, Xiaohong "Collaborative SVG as a Web Service," Syracuse University, 2003, 29 pages.

International Search Report for International Application No. PCT/US08/081798 dated Oct. 30, 2008 9 pages.

* cited by examiner

SYSTEM AND METHOD OF PRESENTING MEDIA DATA

FIELD OF THE DISCLOSURE

The present disclosure is generally related to presenting media data.

BACKGROUND

The Internet provides new communication avenues. For example, individuals, advertisers or others can distribute media in a manner that is widely accessible via the Internet. Hence, there is a need for improved systems and methods of presenting media data.

DETAILED DESCRIPTION OF THE DRAWINGS

Figure 1:
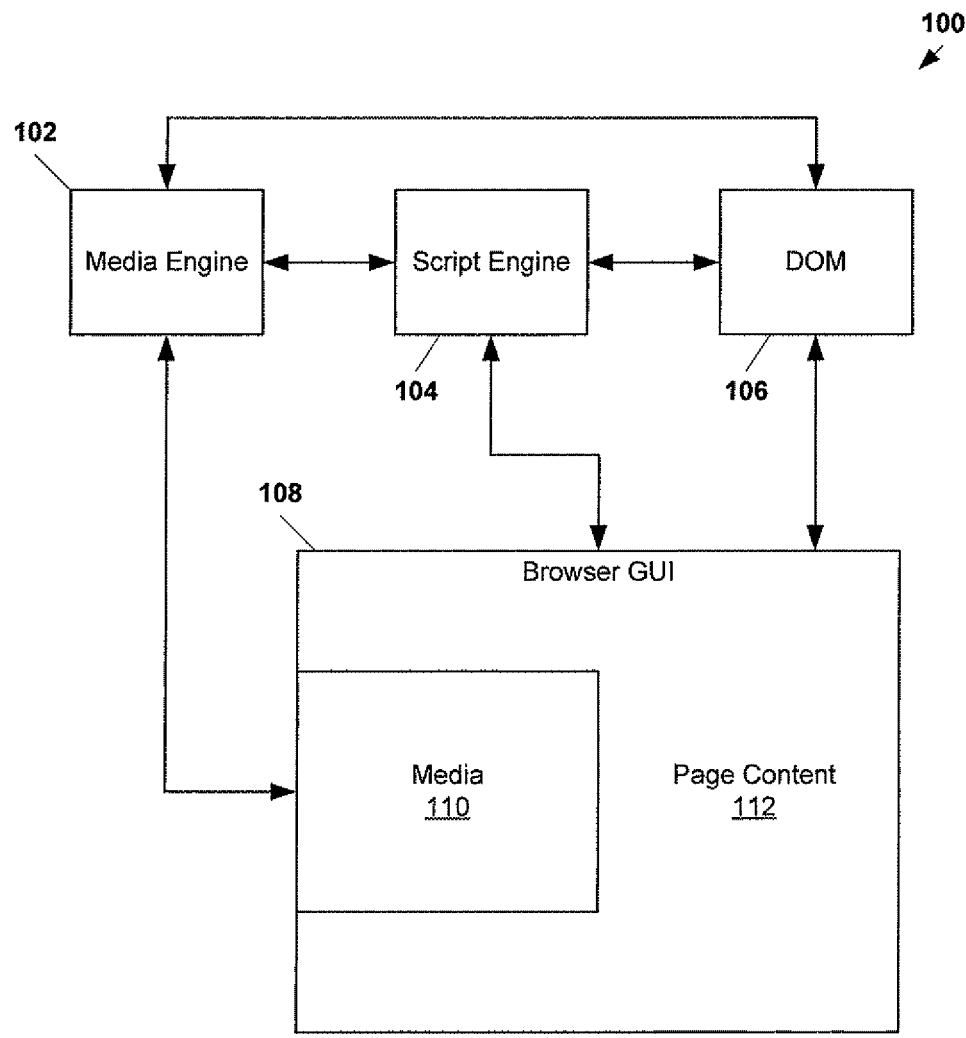
FIG. 1 is a block diagram of a particular embodiment of a system to present media data.

A method of presenting media data is disclosed and includes receiving a first event message associated with media data from a media engine that is presenting the media data via a graphical user interface (GUI). The method also includes executing an instruction in response to the first event message. The script modifies an in-memory representation associated with the GUI in which the media data is being presented.

In another particular embodiment, a method of presenting media data includes receiving a first event message associated with a time index of the media data. The first event message is received from a media engine presenting media data via a graphical user interface (GUI). The method also includes executing a first instruction in response to the first event message. The first instruction determines content of an in-memory representation associated with the GUI. The method also includes executing a second instruction in response based on the content of the in-memory representation. The second instruction modifies the presentation of the media data.

In another particular embodiment, a method of presenting media data includes receiving a first event message associated with a graphical user interface (GUI). The method also includes executing a first instruction in response to the first event message. The first instruction modifies an in-memory representation associated with the GUI. The method also includes executing a second instruction. The second instruction modifies a presentation of media data in the GUI.

In another particular embodiment, a method of presenting media data includes presenting media data via a graphical user interface (GUI). The method also includes sending an event message associated with a time index of the media data to a script engine. The event message includes an instruction to modify an in-memory representation associated with the GUI.

In a particular embodiment, a data structure includes media data. The data structure also includes at least one event message associated with a particular time index of the media data. The at least one event message is adapted to cause a processor including a script engine to modify an in memory representation of a graphical user interface (GUI) in which the media data is presented.

In a particular embodiment, a computer-readable medium includes instructions that, when executed by a processor, cause the processor to receive an event message associated with the media data from a media engine presenting media data via a graphical user interface (GUI). The computer-readable medium also includes instructions that, when executed by the processor, cause the processor to execute a function in response to the first event message. The function modifies an in-memory representation associated with the GUI in which the media data is being presented.

In another particular embodiment, a computer-readable medium includes instructions that, when executed by a processor, cause the processor to receive a first event message associated with a time index of the media data from a media engine presenting media data via a graphical user interface (GUI). The computer-readable medium also includes instructions that, when executed by the processor, cause the processor to execute a first function in response to the first event message. The first function determines content of an in-memory representation associated with the GUI. The computer-readable medium also includes instructions that, when executed by the processor, cause the processor to execute a second function based on the content of the in-memory representation. The second function modifies the presentation of the media data.

In another particular embodiment, a computer-readable medium includes instructions that, when executed by a processor, cause the processor to receive a first event message associated with a graphical user interface (GUI). The computer-readable medium also includes instructions that when executed by the processor, cause the processor to execute a first function in response to the first event message. The first function modifies an in-memory representation associated with the GUI. The computer-readable medium also includes instructions that, when executed by the processor, cause the processor to execute a second function. The second function modifies a presentation of media data in the GUI.

In another particular embodiment, a computer-readable medium includes instructions that, when executed by a processor, cause the processor to present media data via a graphical user interface (GUI). The computer-readable medium also includes instructions that, when executed by the processor, cause the processor to send an event message associated with a time index of the media data to a script engine. The event message includes an instruction to modify an in-memory representation associated with the GUI.

FIG. 1 depicts a block diagram of a particular embodiment of a system to present media data, the system generally designated 100. The system 100 includes a graphical user interface (GUI) 108. In a particular embodiment, the GUI 108 is adapted to display page contents 112 as well as to present media 110. For example, the GUI 108 may include a browser application, such as the Microsoft Internet Explorer™ browser, the Mozilla Firefox™ browser, or any other browser application. The GUI 108 may be adapted to generate a display based on Hypertext Markup Language (HTML), Dynamic HTML (DHTML), Extensible HTML (XHTML), Wireless Markup Language (WML), another markup language, or any combination thereof.

The system 100 also includes a media engine 102 adapted to receive media data from a media source, such as a media server, and to present the media data via the GUI 108. The media data may include video content, audio content, graphics content, other media content, or any combination thereof. For example, the media data may include Flash® video content, Motion Picture Expert Group (MPEG) content, Windows Media Video (WMV) content, RealAudio™ or RealVideoT™ content, content using any other media format, or any combination thereof. In a particular embodiment, the media data includes a Shockwave™ Flash® (SWF) object with embedded Flex® code. The terms JavaScript™, Flex® Shockwave™ and Flash® may be referred to herein as JavaScript, Flex, Shockwave, and Flash, respectively.

The system 100 further includes a script engine 104. The script engine 104 is adapted to execute scripts to modify content of the GUI 108, to modify a representation of the GUI 108 stored in a memory 214, to interact via the GUI 108 with a user, and so forth. The in-memory representation of the GUI 108 includes data stored in a memory that is used to generate the display of page contents 112 in the GUI. In a particular illustrative embodiment, the in-memory representation of the GUI 108 can include a data structure stored in the memory that includes a plurality of objects used to create the display of page contents 112 within GUI 108, such as a Document Object Model (DOM) 106. In an illustrative embodiment, the script engine 104 includes an instance of an ECMAScript engine, such as a Javascript™ engine, associated with the GUI 108. In such an embodiment, Flex code may be adapted to send event messages to the script engine 104 to execute particular functions relative to the DOM 106.

In a particular embodiment, the media engine 102 is adapted to receive media content which includes one or more event messages associated with a time index of the media content. For example, an event message can be associated with a time index of a Flash video in a SWF object. The time index includes a playback time associated with presentation of the media 110. Thus, particular portions of the media 110 may be presented at a particular time index each time the media 110 is presented. The media engine 102 is adapted to send event messages to the script engine 104 for execution. For example, at the time index associated with an event message, the media engine 102 may send the event message to the script engine 104.

In a particular embodiment, the script engine 104 is adapted to receive the event message and to execute a function in response to the event message. For example, the event message can include text, such as a call to a function accessible to the script engine 104, and the script engine 104 may execute the called function in response to the event message. In another example, the event message can include an executable instruction, and the script engine 104 may execute the instruction in response to the event message. By executing the function, the script engine 104 can effect changes to the DOM 106. For example, such changes may include changing a location in the GUI 108 at which the media 110 is displayed, determining information about the page content 112, modifying or interacting with the page content 112, modifying the presentation of the media 110 by the media engine 102, accessing additional media data for display via the media engine 102, accessing additional page content for display via the GUI 108, additional modifications or queries related to the GUI 108 or the DOM 106, or any combination thereof.

Figure 2:
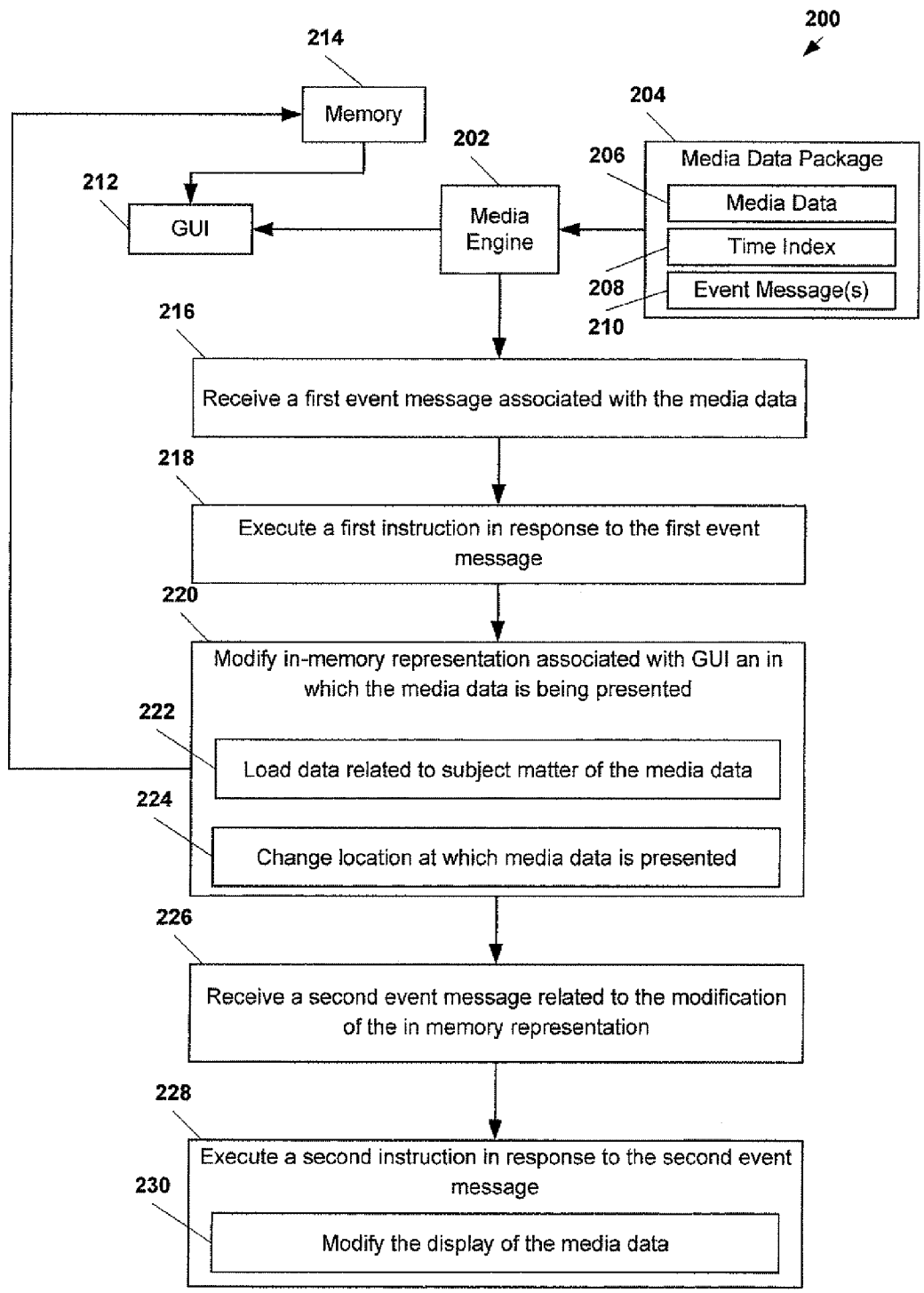
FIG. 2 is a flow chart of a first particular embodiment of a method of presenting media data.

FIG. 2 depicts a flow chart of a first particular embodiment of a method of presenting media data, the method generally designated 200. The method 200 includes, at 216, receiving a first event message associated with media data from a media engine 202. In a particular embodiment, the media engine 202 is adapted to receive a media data package 204 that includes media data 206 and one or more event messages 210 associated with a time index 208 of the media data 206. In a particular embodiment, the media engine 202 tracks the time index 208 of the media data 206 during presentation of the media data 206. The media engine 202 is also adapted to send an event message when the associated time index is reached during presentation of the media data 206. The event message may be received by an event handler associated with a graphical user interface (GUI) 212, such as an event handler of a script engine.

The method 200 also includes, at 218, executing a first instruction, such as a script, in response to the first event message. In an illustrative embodiment, executing the first instruction includes calling a function accessible to the script engine, executing one or more commands embedded within the event message, or any combination thereof.

In a particular embodiment, the method 200 includes, at 220, modifying an in-memory representation associated with the GUI 212 in which the media data 206 is being presented. For example, where the media data 206 is being presented in the GUI 212 as a flash video embedded in a web page, the method can include modifying a Document Object Model (DOM) associated with the web page. In a particular embodiment, modifying the in-memory representation of the GUI 212 includes loading data related to subject matter of the media data 206. For example, where the media data 206 includes a video related to particular subject matter, the DOM may be modified by loading additional data that is related to the subject matter of the video. In a particular embodiment, the method 200 includes, at 224, changing a location at which the media data 206 is presented within the GUI 212. For example, a window available for presentation of the media data can be expanded, contracted or moved within the GUI 212. In a particular illustrative embodiment, the page state of the web page may not be changed as a result of the first instruction.

In a particular embodiment, the method 200 includes, at 226, receiving a second event message related to the modification of the in-memory representation of the GUI 212. For example, the second event message may be received by an event handler of the script engine that monitors for changes to the in-memory representation of the GUI 212. For example, the event handler can monitor for repositioning of display elements within the GUI, e.g., move events, touch screen event or mouseover events. In another example, the event handler can monitor the in-memory representation of the GUI to identify other user interaction events, such as selections of display elements within the GUI, other mouse events, touch screen events or keyboard events, or any combination thereof.

The method 200 also includes, at 228, executing a second instruction, such as a script, in response to the second event message. In a particular embodiment, the second instruction modifies the display of the media data, at 230. For example, the second instruction can access and display additional media data. In another example, the second instruction can change a time index associated with playback of the media data such that the media data is presented non-linearly. That is, by changing the time index associated with the media data, a portion of the media data may be skipped or a portion of the media data may be repeated.

In an illustrative embodiment of the method 200, the media data package 204 includes a Shockwave Flash (SWF) object. At a particular point in time during presentation of video content of the SWF object, the media engine 202 (e.g., a flash player) issues an event message associated with the time index of the video content. The event message is received by an event handler of a script engine (such as a Javascript™ engine) and an instruction is executed by the script engine. In a particular example, the instruction may select a particular portion or display element within the GUI 212. When the display element is selected, the in-memory representation of the GUI (e.g., the DOM) may be modified to indicate selection of the display element, and the GUI presented to the user may change to indicate selection of the display element. After the display element is selected, a user may interact with the display element via the GUI 212 as though the user selected the element using a mouse, touch screen or other pointing device. For example, the user can unselect the display element or interact with the display element to perform an action with respect to the display element. In another example, the user can select an additional or alternate display element. In an illustrative embodiment, a second event message is sent in response to the user's interaction. The second event message is received by an event handler. The second event message can cause the script engine to execute one or more additional instructions or scripts. In a particular embodiment, the additional instructions or scripts are based on the user interaction. That is, the second event is selected based on the user's interaction, or includes information about the user's interaction, such that a particular instruction or script is executed in response to the user's interaction. For example, the second event message may cause the video display to be modified. To illustrate, the time index of the video display may be modified to advance the video to a desired time index. The video content associated with the desired time index may include information relevant to the change made to the GUI 212.

To further illustrate a particular illustrative embodiment of the method 200, the media content can include a tutorial related to information presented in the GUI 212, such as a video tutorial related to using a web page. At a particular point during the tutorial, dealing with selection or modification of display elements within the GUT 212, the video may indicate that an element within the GUI 212 will be selected. In conjunction with or after the video indicates that the display element portion will be selected, an event message can be sent from the media player displaying the video to a scripting engine. In response to the event message, the scripting engine can cause the element within the GUI to be selected. The user can then interact with the selected element as though the user had selected the element. For example, when a drag and drop feature is available with respect to the selected element, the user may drag the selected element to a desired location. In another example, the user may select an alternate display element. In yet another example, the user may not interact with any display elements in accordance with the tutorial and may instead interact with a separate element. In response to the user interaction, the script engine may receive a second event message. The second event message may cause an instruction to be executed which modifies the media data display. For example, where a user selects a separate display element during the execution of the tutorial, the tutorial may be advanced to a portion of the video that deals with the element selected by the user.

Figure 3:
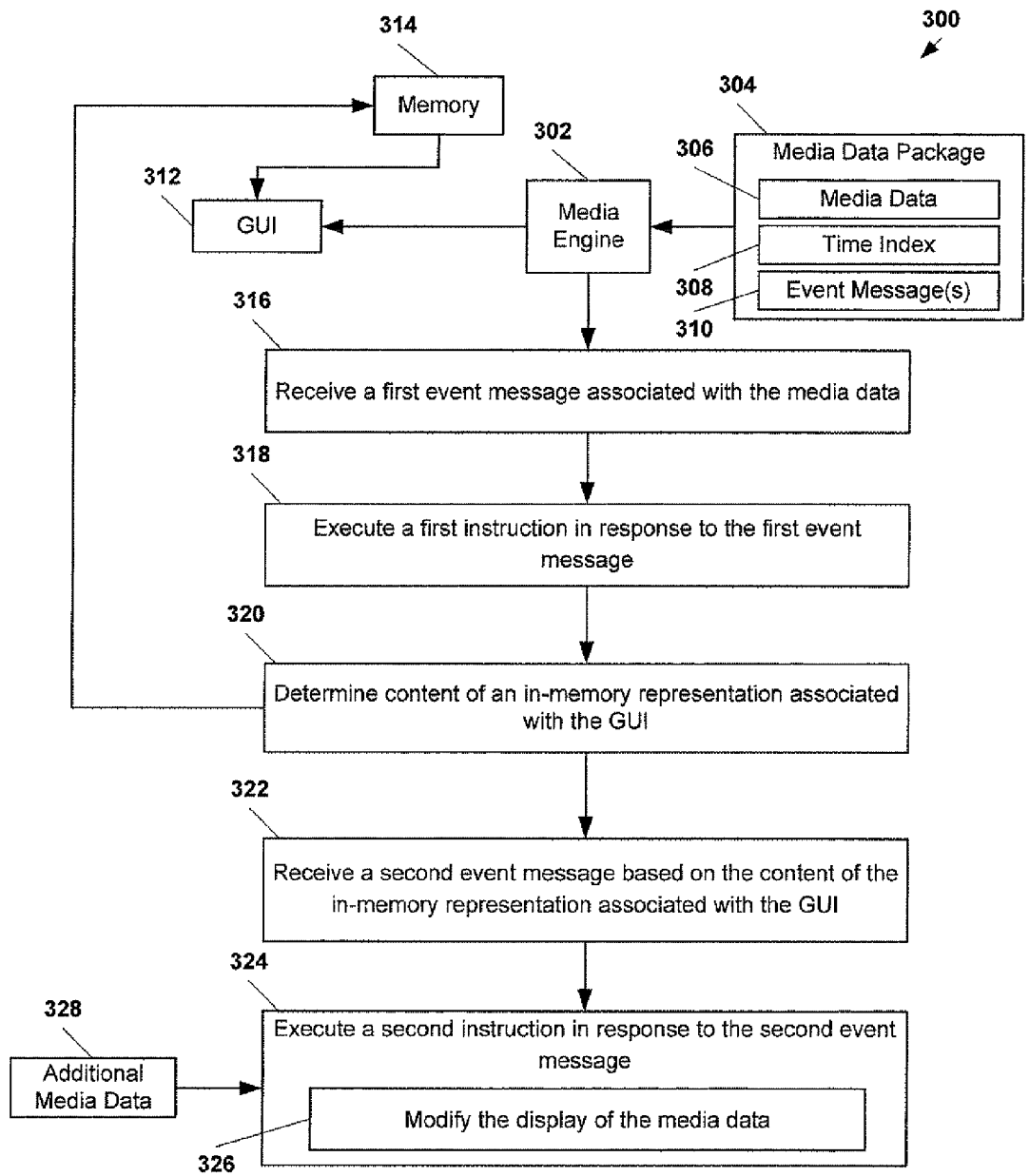
FIG. 3 is a flow chart of a second particular embodiment of a method of presenting media data.

FIG. 3 depicts a flow chart of a second particular embodiment of a method of presenting media data, the method generally designated 300. The method 300 includes, at 316, receiving a first event message associated with media data from a media engine 302. In a particular embodiment, the media engine 302 is adapted to receive a media data package 304 that includes media data 306 and one or more event messages 310 associated with a time index 308 of the media data 306. In a particular embodiment, the media engine 302 tracks the time index 308 of the media data 306 during presentation of the media data 306. The media engine 302 is also adapted to send an event message when the associated time index is reached during presentation of the media data 306. The event message may be received by an event handler associated with a graphical user interface (GUI) 312, such as an event handler of a script engine.

The method may also include, at 318, executing an instruction, such as a script, in response to the first event message. In a particular embodiment, at 320, the instruction determines content of an in-memory representation associated with the GUI 312. For example, the instruction can search a Document Object Model (DOM) in memory 314 that is used by a browser application to prepare the GUI 312.

The method 300 also include, at 322, receiving a second event message based on the content of the in-memory representation of the GUI. For example, the second event message may indicate that a particular term was present in the GUI 312. In another example, the second event message may include other information about the GUI, such as information about input received from a user. To illustrate, the user may enter a search term, and the content of the search term may be included in the second event message. In another example, the second event message may include information about a mouse events, touch screen event or keyboard events associated with the GUI 312.

The method 300 also includes, at 324, executing a second instruction in response to the second event message. At 326, the second instruction modifies the display of the media data 306. For example, the display of the media data may be modified by accessing additional media data 328. In another example, the display of media data may be modified such that a portion of the media data is skipped or a portion of the media data is repeated.

In a particular illustrative embodiment of the method 300, a flash video may be received by the media engine 302 for presentation via the GUI 312. The GUI 312 may be associated with a browser application. At a particular time index during presentation of the media data, the media engine 302 may issue a first event message. The first event message may be received by a script engine which may execute a function to determine content of the GUI 312. For example, the script engine may search a DOM associated with the browser application. Based on the content of the GUI 312, a second function is executed. The second function causes the display of the media data to be modified. For example, when a particular term is present in the GUI 312, the time index of the flash video may be changed such that a portion of the flash video associated with that term is presented. In another example, when a user types a search term into a search box, the time index of the flash video may be changed such the video presents additional search terms or other advice related to the search.

To further illustrate a particular illustrative embodiment of the method 300, the media data may include a flash video tutorial. During presentation of the video tutorial, a first event message may be received from the media engine 302. The first event message may include or trigger a function to determine what page a user is viewing when the tutorial is viewed. The first event message may cause a script engine to search the page to identify the page or the page contents. A subsequent function may be executed to advance the tutorial to a portion of the video appropriate to the particular page being viewed.

In another example, the media content includes advertising content. During presentation of the advertising content, an event message may be received from the media engine 302. The event message may include or trigger a function to determine the contents of the page upon which the advertisement is being presented. The contents of the page may be searched to identify particular key words or concepts associated with the advertisement, an advertiser, or advertising placement. A second function is executed to advance the advertisement to a portion appropriate to the content being viewed at the page or to access additional media data appropriate to the page to in which the advertisement is displayed.

Figure 4:
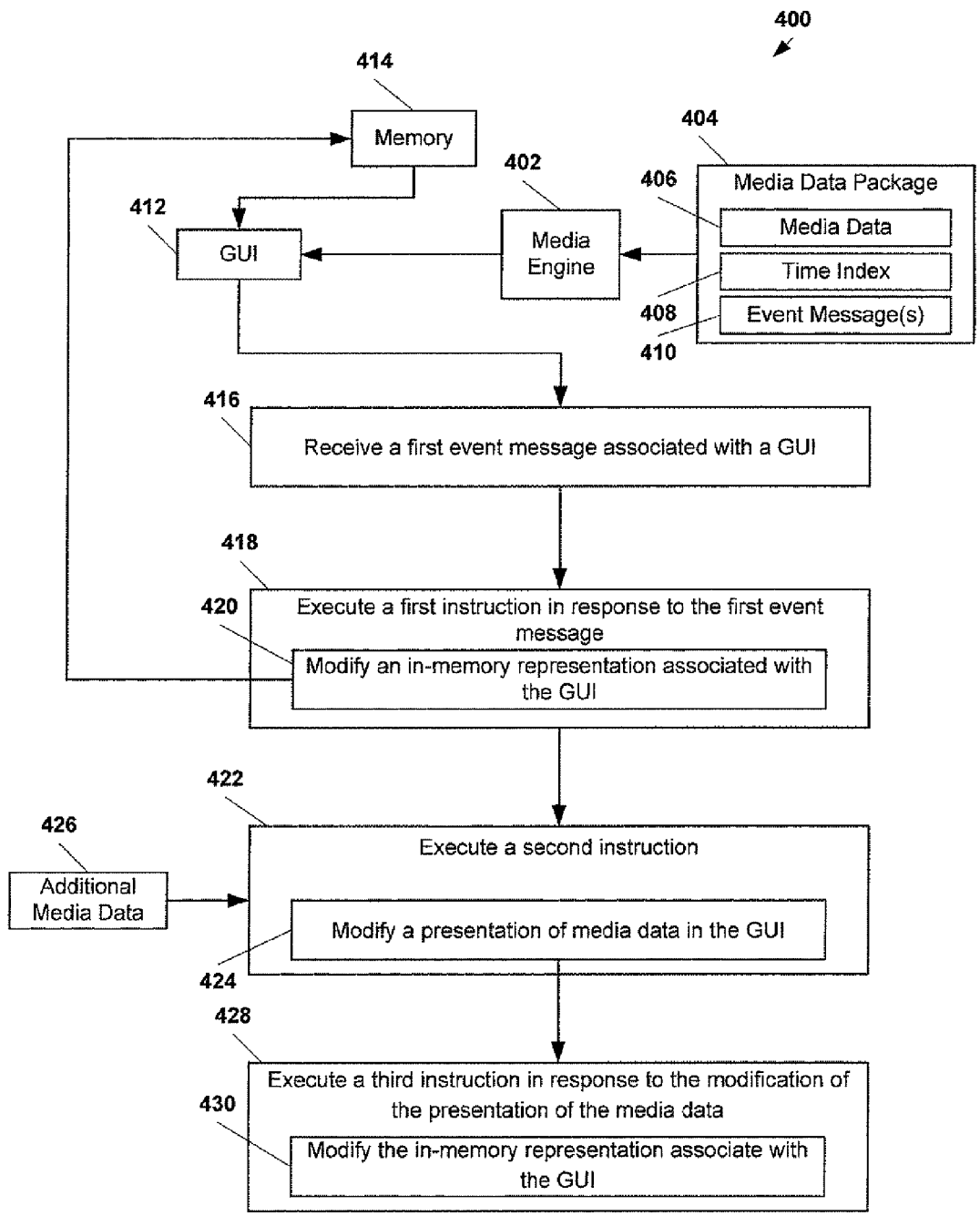
FIG. 4 is a flow chart of a third particular embodiment of a method of presenting media data.

FIG. 4 depicts a flow chart of a third particular embodiment of a method of presenting media data, the method generally designated 400. The method 400 includes, at 416, receiving a first event message associated with a graphical user interface (GUI) 412. For example, the first event message may be received by an event handler associated with the graphical user interface (GUI) 412, such as an event handler of a script engine. The event message may be associated with user input received via the GUI 412, such as a keyboard event, a touch screen event or a mouse event.

In a particular embodiment, the GUI 412 may include a browser application associated with or including a media engine 402. The media engine 402 is adapted to receive a media data package 404 that includes media data 406 and one or more event messages 410. The media engine 402 is also adapted to present the media data via the GUI 412. A memory 414 may store an in-memory representation of the GUI 412, such as a Document Object Model (DOM).

The method 400 also includes, at 418, executing an instruction, such as a script, in response to the first event message. In an illustrative embodiment, executing the instruction includes calling a function accessible to the script engine, executing one or more commands embedded within the event message, or any combination thereof. In a particular embodiment, the method 400 includes, at 420, modifying an in-memory representation associated with GUI 412 in which the media data 406 is being presented. For example, where the media data 406 is being presented in the GUI 412 as a flash video embedded in a web page, the method 400 can include modifying the DOM associated with the web page. To illustrate, the DOM may be modified to change the content of the GUI 412, to interact with one or more elements of the GUI 412, to change other aspects of the GUI 412 or the GUI's contents, or any combination thereof. In a particular embodiment, modifying the in-memory representation of the GUI 412 includes loading data related to subject matter of the media data 406. For example, where the media data 406 includes a video related to a particular subject matter, the DOM may be modified by loading additional information that is related to the subject matter of the video.

The method 400 also includes, at 422, executing a second instruction or script. For example, at 424, the second instruction may modify the presentation of the media data 406 in the GUI 412. The presentation of the media data may be modified to change a size or location of the media data presentation within the GUI 412, to change a time index associated with presentation of the media data (e.g., to repeat or skip portions of the media data), to access additional media data 426, or any combination thereof.

In a particular embodiment, the method 400 also includes, at 428, executing a third instruction or script in response to the modification of the presentation of the media data. For example, at 430, the third script may modify the in-memory representation associated with the GUI 412.

To further illustrate a particular embodiment of the method 400, a user may view a web page including media data, such as a product catalog display or search results display at a website of an online retailer. The media data may include advertising or user recommendation content. For example, the media data may include user recommendation content associated with a particular category of products displayed to the user in the web page. A user interaction event may be received from the user's browser application. For example, the user interaction event may include a mouse event (such as a mouseover, mouseup, click, mousemove, etc.), a touch screen event (such as a selection, scroll, move, etc.) or a keyboard event (such as a keypress, keyup, keydown, etc.). In a particular illustrative embodiment, the user interaction event can be generated in response to a user entering a search term into a search query field of the web page. In response to the user interaction event, the web page may be modified. For example, new search results may be displayed, or a particular item in the web page display may be selected. In response to the modification of the web page, or in response to the user interaction event, an instruction can be executed to modify the presentation of the media data. For example, new media data can be loaded, or a time index of the media data can be changed. In response to the modification of the presentation of the media data, the web page display may be changed. For example, additional information about a particular item may be added to the web page display, or suggested search terms may be entered in a search query field.

To further illustrate a particular illustrative embodiment of the method 400, a first user may generate and upload a user recommendation video. For example, the user recommendation video can include a discussion of the features of a particular product, discussion of competing products, discussion of product accessories, or other information related to the product or use of the product. When a second user searches for the product at an online retailer, the user recommendation video may be presented along with the search results. While the user recommendation video is playing, the second user may select or mouseover a display element related to a product accessory, which can cause an event message to be generated indicating user interest in the display element. For example, the display element may be highlighted in the display. Additionally, an instruction may be executed to change a time index of the user recommendation video or to load a different user recommendation video such that user recommendation video content associated with the display element is presented. During presentation of the user recommendation video content, the video player may send an instruction to the browser application to place recommended search terms in a search query field, or to display product information related to a product discussed in the user recommendation video. In a particular embodiment, the first user may receive payment for the user recommendation video based at least partially on whether other users purchase products discussed in the user recommendation video, or whether other users purchase products that the user recommendation video causes to be presented via the web page.

Figure 5:
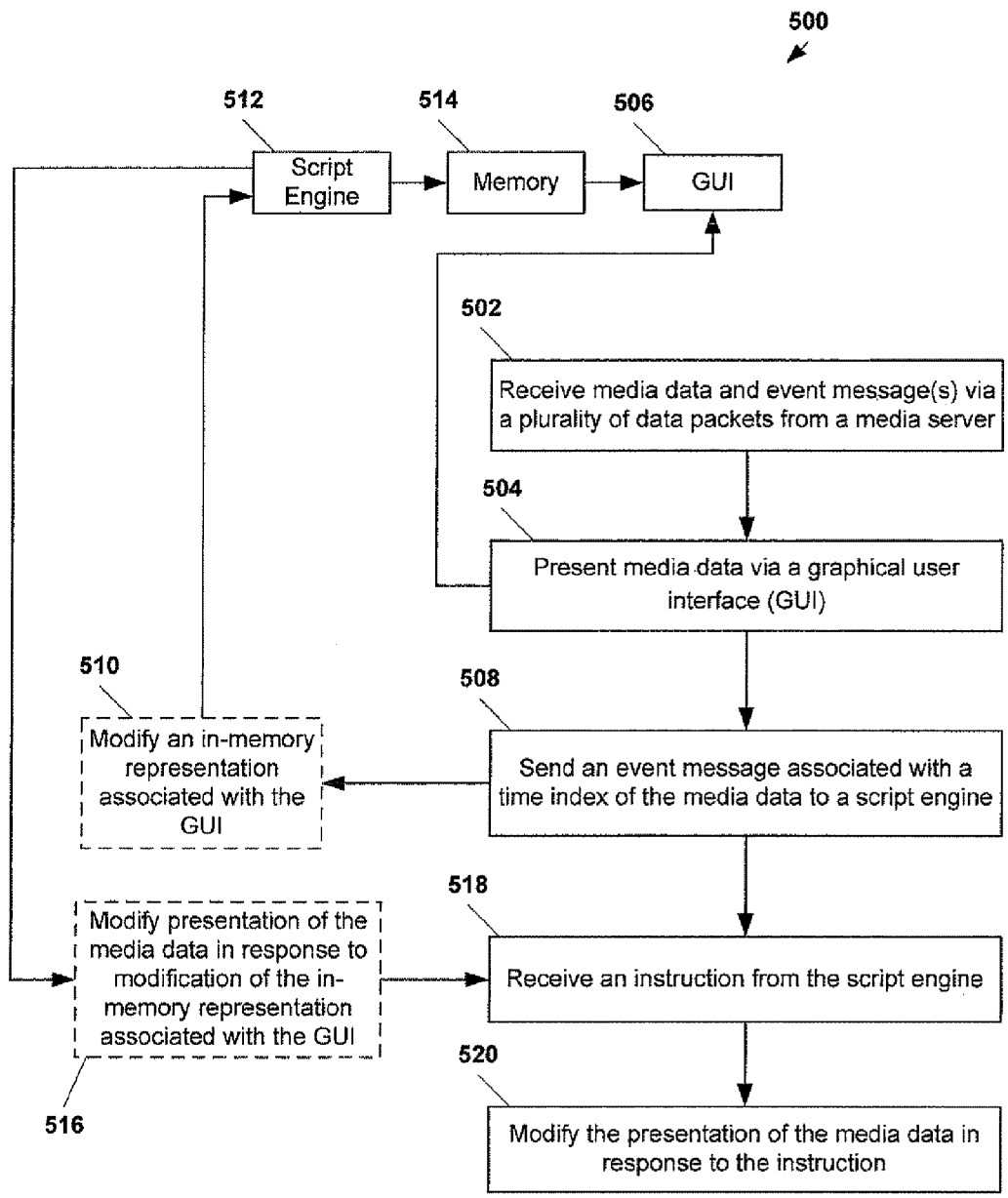
FIG. 5 is a flow chart of a fourth particular embodiment of a method of presenting media data.

FIG. 5 depicts a flow chart of a third particular embodiment of a method of presenting media data, the method generally designated 500. The method 500 includes, at 502, receiving media data and one or more event messages via a plurality of data packets from a media server. For example, the media data and one or more associated event messages may be received as Shockwave Flash (SWF) objects. The method 500 also includes, at 504, presenting the media data via a graphical user interface (GUI) 506. For example the GUI 506 may include a browser application associated with or including a media engine compatible with the media data. The GUI 506 may also include or be associated with a representation of the GUI 506 stored in a memory 514. For example, the in-memory representation of the GUI 506 may include a Document Object Model (DOM).

The method 500 also includes, at 508, sending an event message associated with a time index of the media data to a script engine 512 during playback of the media data. For example, the event message may be sent from the media engine. The event message includes, at 510, an instruction to modify the in-memory representation associated with the GUI 506. A script engine 512 may execute a function in response to the event message. For example, the script engine 512 can modify the in-memory representation of the GUI 506. Additionally, the script engine 512 can send an instruction to modify presentation of the media data in response to modification of the in-memory representation of the GUI, at 516. The method 500 includes, at 518, receiving the instruction from the script engine 512. The method 500 also includes, at 520, modifying the presentation of the media data in response to the instruction.

Figure 6:
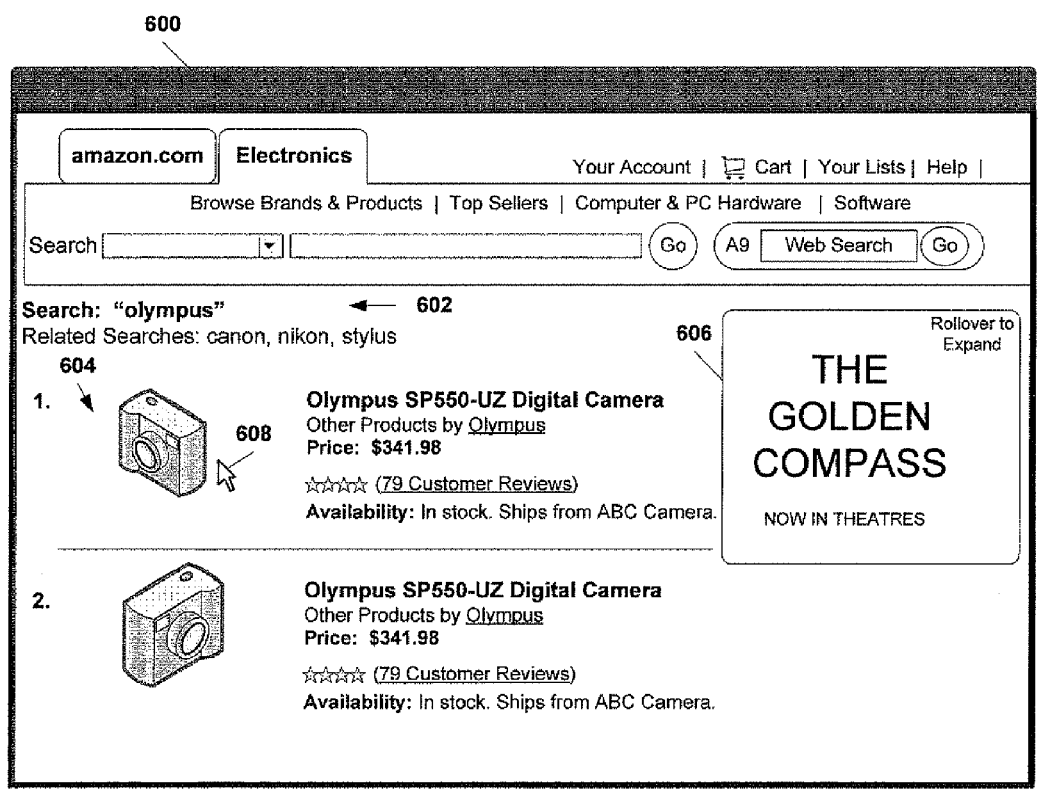
FIG. 6 is a diagram of a first particular embodiment of a graphical user interface for presenting media.

FIG. 6 depicts a first particular embodiment of a graphical user interface (GUI) display for presenting media data, the GUI generally designated 600. The GUI 600 illustrates interaction between media content and other information presented via the GUI 600. As depicted in FIG. 6, the GUI 600 includes a search interface and search results related to a search query 602 for the term "olympus". The GUI 600 also includes a plurality of search results 604 associated with the search query. In a particular illustrative embodiment, the search results 604 relate to products offered for sale. The GUI 600 also includes an advertisement 606. The advertisement 606 indicates that it includes rollover functionality. That is, when a pointer 608 is moved over the advertisement 606, a user interaction event is triggered and the advertisement 606 is modified.

Figure 7:
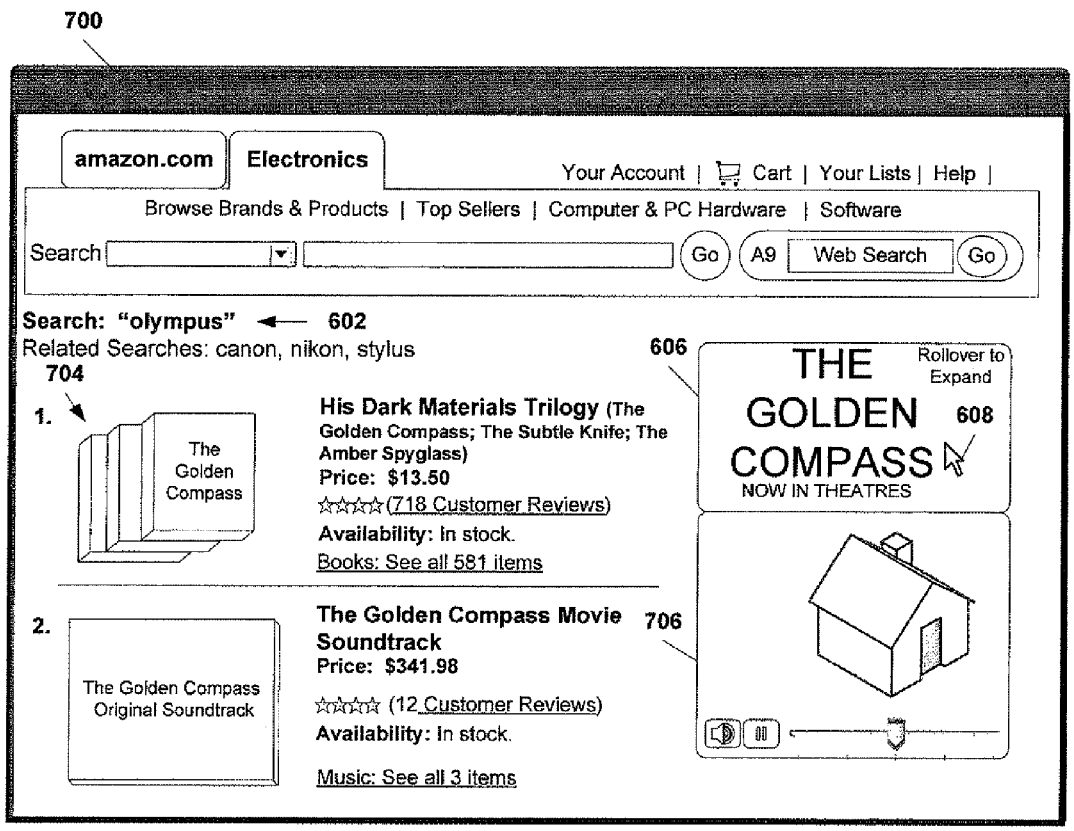
FIG. 7 is a diagram of a second particular embodiment of a graphical user interface for presenting media.

FIG. 7 depicts a second particular embodiment of a graphical user interface (GUI) for presenting media data, the GUI generally designated 700. The GUI 700 illustrates an illustrative embodiment of modifications made to the GUI 600 after the pointer 608 has been moved over the advertisement 606. Upon detection of the mouseover (or rollover) event, playback of media content 706 may be initiated. At a particular time index associated with playback of the media content, an event message may be sent by a media engine presenting the media content. The event message causes a script engine to modify information presented via the GUI 700. For example, the search results 604 (illustrated in FIG. 6) can be replaced by search results 704 associated with the media content 706. At a subsequent time index of the media content 706, the original search results 604 can again be displayed and the search results 704 associated with the media content can be removed. Thus, by rolling over the advertisement 606, the user is able to view media data associated with the advertisement 706 and is presented with product information associated with the media data 706.

To further illustrate a particular embodiment, when the pointer 608 is moved over the search term 602, the original search results 604 may be presented and the modified search results 704 may be removed. The playback of the media content 706 may continue, may be stopped, may be modified in some other way, or any combination thereof.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The term "computer-readable medium" includes a single medium or multiple media, such as a centralized or distributed database, and/or associated caches and servers that store one or more sets of instructions. The term "computer-readable medium" also includes any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    causing, by a processor, display of original search results in a graphical user interface (GUI) comprising a web page, the original search results comprising one or more items offered by an online retailer;
    receiving, by the processor and from a media source, a data structure that includes media data to be presented within the GUI, the media data having a time index for playback of the media data and content;
    playing the media data by a media engine executed by the processor in the GUI;
    receiving, by the processor, a first event message from the media engine in response to reaching a first particular time of the time index associated with the playback of the media data, the first event message including a script;
    modifying, by a script engine of the processor executing the script, an in-memory representation of the GUI in which the media data is presented by:
        temporarily replacing, by the processor, the original search results of the one or more items with new search results of one or more other items associated with the content of the media data at the first particular time and causing display of the new search results; and
        after the temporarily replacing and upon the media data reaching a second particular time of the time index during the playback of the media data, removing, by the processor, the new search results from display and causing display of the original search results of the one or more items;
    receiving, by the processor, a second event message associated with a user interacting with the displayed web page that results in a change to the in-memory representation of the GUI; and executing, by the processor, an instruction in response to the second event message, the instruction modifying the playing of the media data by advancing to a third particular time of the time index associated with the playback of the media data.

2. The method of claim 1, wherein the media data comprises video data.

3. The method of claim 1, wherein the first event message is further adapted to cause the script engine to determine content of the GUI by accessing the in-memory representation of the GUI before the script engine modifies the in-memory representation of the GUI.

4. The method of claim 3, wherein the first event message is further adapted to cause the script engine to access additional media data based on the content of the GUI.

5. The method of claim 3, wherein the first event message is further adapted to cause the media data to be presented in a particular order based on the content of the GUI.

6. The method of claim 1, wherein the GUI representing the web page is displayed via a browser application.

7. The method of claim 1, wherein the in-memory representation of the GUI comprises a data structure stored in a memory, wherein the data structure includes a plurality of objects used to create the GUI.

8. A method comprising:
    causing, by a processor, display of multiple items offered by an online retailer via a graphical user interface (GUI);
    causing, by the processor, display of media data having a time index for playback of the media data within a media player that is presented in the GUI separately from the multiple items;
    receiving, by the processor and from a media engine controlling the display of the media data in the media player, a first event message associated with the media data, the first event message including a first instruction of a scripting language;
    at least partly in response to a script engine executing the first instruction received via the first event message, modifying, by the processor, an in-memory representation of the GUI to select a particular item of the multiple items, as though a user had selected the particular item, and causing a change to the GUI that is displayed to indicate that the particular item was selected;
    receiving, by the processor, a second event message related to a change in the in-memory representation of the GUI, the change being associated with a user interacting with another item of the multiple items displayed via the GUI separately from the media player; and
    executing, by the script engine, a second instruction of the scripting language in response to the second event message, wherein the second instruction modifies display of the media data by initiating playback of the media data from a point in the time index that is associated with content of the media data relating to the other item.

9. The method of claim 8, wherein the first event message is associated with a first particular time of the time index associated with the playback of the media data, and the point in the time index that is associated with the content of the media data relating to the other item is a second particular time.

10. The method of claim 8, wherein the second instruction changes a location in the GUI at which the media data is presented.

11. The method of claim 8, wherein the second instruction loads data related to subject matter of the media data.

12. The method of claim 8, wherein the interacting with the other item by the user comprises at least one of the user entering a search term related to the other item in a search query field in the GUI or the user selecting the other item in the GUI.

13. A method comprising:
    causing, by a processor, display of a media player and one or more items offered by an online retailer via a graphical user interface (GUI), the one or more items being presented in the GUI separately from the media player;
    receiving media data having a time index for playback of the media data from a media source, the media data including user recommendation content associated with the one or more items displayed in the GUI;

presenting the media data in the media player;
receiving, by the processor and from a media engine presenting the media data in the media player within the GUI, a first event message associated with the media data;
executing, by the processor a first instruction in response to the first event message, the first instruction executing a script embedded within the first event message to determine content of an in-memory representation associated with the GUI;
receiving, by the processor and from the media engine, a second event message identifying changes to the in-memory representation associated with the GUI in response to user interaction with a particular item of the one or more items; and
executing, by the processor, a second instruction in response to the user interaction with the particular item, the second instruction causing the media data presented via the media player within the GUI to advance to, and initiate the playback from, a point in the time index that is associated with content of the media data relating to the particular item.

14. The method of claim 13, wherein determining the content of the in-memory representation comprises determining subject matter of one or more display elements displayed via the GUI.

15. The method of claim 14, wherein the second instruction further modifies display of the media data by accessing additional media data related to the subject matter of the one or more display elements.

16. The method of claim 13, wherein the second instruction further modifies display of the media data by changing a location in the GUI at which the media data is presented.

17. The method of claim 14, wherein the in-memory representation associated with the GUI comprises a Document Object Model.

18. A method comprising:
causing, by a processor, display of first search results of one or more items offered by an online retailer via a graphical user interface (GUI);
playing, by the processor, media data having a time index for playback of the media data via the GUI;
during the playing of the media data:
receiving, by the processor, a first event message associated with a first particular time of the time index associated with the playback of the media data;
executing, by the processor, a first instruction in a script at least partly in response to the first event message;
at least partly in response to executing the first instruction, modifying, by the processor, an in-memory representation associated with the GUI by:
temporarily replacing, by the processor, the first search results of the one or more items with new search results of one or more other items associated with content of the media data at the first particular time in the in-memory representation associated with the GUI;
causing displaying of the new search results; and
after the temporarily replacing and upon the media data reaching a second particular time of the time index during the playback of the media data, removing, by the processor, the new search results from display and causing display of the first search results of the one or more items by reverting the in-memory representation associated with the GUI; and executing, by the processor, a second instruction in the script, wherein executing the second instruction causes a presentation of the media data to be modified by advancing to a third particular time of the time index associated with the playback of the media data.

19. The method of claim 18, wherein the second instruction is associated with a user interaction event message.

20. The method of claim 19, wherein the user interaction event message comprises a mouse event message.

21. The method of claim 20, wherein the mouse event message indicates a mouseover event.

22. The method of claim 19, wherein the user interaction event message comprises a keyboard event message.

23. The method of claim 19, wherein the user interaction event message comprises a touch screen event message.

24. The method of claim 18, further comprising executing a third instruction in response to the modification of the presentation of the media data, wherein executing the third instruction causes the in-memory representation associated with the GUI to be modified.

25. A method comprising:
causing display, in a browser application executed by a processor, of a graphical user interface (GUI);
receiving, by the processor and from a first user, via the GUI, a search request for a first item that is available at an online retailer;
at least partly in response to the search request, presenting, by the processor and via the GUI, media data having a time index for playback of the media data within a media player along with search results that are presented separately from the media player, the media data the media data having been uploaded by a second user;
initiating playback of the media data by the media player at a first point in the time index;
while the media data is playing:
at least partly in response to the first user selecting a particular item included in the search results, causing, by the processor, an event message to be generated indicating user interest in the particular item; and
at least partly in response to the event message, sending, by the processor, an instruction to the browser application causing the media data presented via the media player within the GUI to skip to, and initiate the playback from, a second point in the time index that is associated with content of the media data relating to the particular item.

26. The method of claim 25, further comprising receiving the media data and an associated event message via a plurality of data packets from a media server.

27. The method of claim 25, wherein the media data includes an object with embedded code.

28. The method of claim 27, wherein the embedded code is adapted to send event messages to a script engine to cause particular functions to be executed.

29. The method of claim 28, wherein the script engine includes an ECMAScript engine.

30. A method performed under control of a processor configured with executable instructions, the method comprising:
causing display of a web page in a web browser, the web page including original search results of one or more items offered by an online retailer and media data having content and a time index for playback of the media data;
at least partly in response to a user interacting with the web page, receiving a user interaction event from the web browser;

at least partly in response to receiving the user interaction event, initiating playback of the media data by a media engine;

while the media data is playing:
- at a first particular time of the time index associated with the playback of the media data, sending a first event message by the media engine that is playing back the media data;
- at least partly in response to the first event message sent by the media engine, changing the display of the web page by temporarily replacing the original search results of the one or more items with new search results displayed in the webpage, the new search results including one or more other items associated with the content of the media data at the first particular time; and
- after the temporarily replacing:
    - at a second particular time of the time index associated with the playback of the media data, sending a second event message by the media engine that is playing back the media data; and
    - at least partly in response to the second event message, removing the new search results from display and causing display of the original search results of the one or more items.

31. The method of claim 30, wherein the original search results of the one or more items are included in the web page as a result of searching a website of the online retailer using an original search term.

32. The method of claim 30, wherein the content of the media data includes advertising content or user recommendation content.

33. The method of claim 30, wherein the user interaction event includes at least one of a mouse event, a touch-screen event, or a keyboard event.

34. The method of claim 30, wherein the first event message comprises sending an instruction to the web browser to automatically enter a suggested search term into a search query field in the web page, the suggested search term being based on the content of the media data at the first particular time.

* * * * *